United States Patent
Klein

(10) Patent No.: US 8,180,914 B2
(45) Date of Patent: May 15, 2012

(54) DELETING DATA STREAM OVERLOAD

(75) Inventor: Anja Klein, Dresden (DE)

(73) Assignee: SAP AG, Walldorf (DE)

( * ) Notice: Subject to any disclaimer, the term of this patent is extended or adjusted under 35 U.S.C. 154(b) by 336 days.

(21) Appl. No.: 12/504,670

(22) Filed: Jul. 17, 2009

(65) Prior Publication Data

US 2011/0016469 A1     Jan. 20, 2011

(51) Int. Cl.
*G06F 15/16* (2006.01)

(52) U.S. Cl. ....................................................... 709/231

(58) Field of Classification Search ........................ None
See application file for complete search history.

(56) References Cited

U.S. PATENT DOCUMENTS

| | | | |
|---|---|---|---|
| 2003/0061017 A1* | 3/2003 | Dotaro et al. | 703/14 |
| 2006/0184527 A1 | 8/2006 | Chi et al. | |
| 2007/0226188 A1 | 9/2007 | Johnson et al. | |
| 2009/0074043 A1* | 3/2009 | Turaga et al. | 375/224 |
| 2009/0100014 A1* | 4/2009 | Gedik et al. | 707/3 |
| 2009/0187584 A1* | 7/2009 | Johnson et al. | 707/100 |
| 2009/0187914 A1* | 7/2009 | Chi et al. | 718/103 |

FOREIGN PATENT DOCUMENTS

| | | |
|---|---|---|
| EP | 1983437 A1 | 10/2008 |
| WO | WO 2007/109446 A1 | 9/2007 |

OTHER PUBLICATIONS

D. Abadi, D. Carney, U. Çetintemel, M. Cherniack, C. Convey, S. Lee, M. Stonebraker, N. Tatbul, and S. Zdonik; Aurora: A new model and architecture for data stream management; VLDB Journal Special Issue on Best Papers of VLDB 2002, 12(2), 2003 (http://www.cs.brown.edu/research/aurora/vldb03_journal.pdf).

A. Ahuja and Y.-K. Ng; A dynamic attribute-based load shedding scheme for data stream management systems; In ICDT'07, pp. 30-42, 2007 (http://faculty.cs.byu.edu/~dennis/papers/stream07.pdf).

B. Babcock, M. Datar, and R. Motwani; Load shedding for aggregation queries over data streams; In ICDE'04, pp. 350-361, 2004 (http://ilpubs.stanford.edu:8090/657/1/2004-3.pdf).

P. J. Haas; Large-sample and deterministic confidence intervals for online aggregation; In SSDBM'97, pp. 51-63, 1997 (http://citeseerx.ist.psu.edu/viewdoc/summary?doi=10.1.1.49.521).

C. J. Hahn, S. G. Warren, and J. London; Edited synoptic cloud reports from ships and land stations over the globe, 1982-1991, 2008 (http://cdiac.ornl.gov/ftp/ndp026b/ndp026b.pdf).

J. Kang, J. F. Naughton, and S. D. Viglas; Evaluating window joins over unbounded streams; In VLDB'02, pp. 341-352, 2002 (http://www.cs.wisc.edu/niagara/papers/knv02-windowjoin.pdf).

(Continued)

*Primary Examiner* — Ario Etienne
*Assistant Examiner* — Clayton R Williams

(57) ABSTRACT

A system and method to delete overload in a data stream are described.

A method of an embodiment of the invention may analyze data quality information in a data stream and delete data items that are found to be of lower than a desired data quality.

In one embodiment, data items may be evaluated according to maximize a particular aspect of the utility of the data in a data stream.

In one embodiment, a system of an embodiment of the invention may evaluate data quality in a data stream to suggest one or more actions to be performed to improve the data quality in the data stream. Further, the system of the embodiment of the invention may evaluate each suggested action to determine how the suggested action may impact the data quality in the data stream if performed.

9 Claims, 8 Drawing Sheets

OTHER PUBLICATIONS

Anja Klein; Incorporating quality aspects in sensor data streams; in proceedings of the 1st ACM Ph.D. Workshop in CIKM (PIKM), Seiten 77-84, 2007 (http://portal.acm.org/citation.cfm?id=1316888).

J. Kraemer and B. Seeger; Pipes—a public infrastructure for processing and exploring streams; In SIGMOD'04, pp. 925-926, 2004(http://dbs.mathematik.uni-marburg.de/publications/myPapers/2004/KS04.pdf).

Z. Longbo, L. Zhanhuai, W. Zhenyou, and Y. Min; Semantic load shedding for sliding window join-aggregation queries over data streams; In ICCIT'07, pp. 2152-2155, 2007 (http://portal.acm.org/citation.cfm?id=1335913).

F. Naumann and C. Rolker; Assessment methods for information quality criteria; In ICIQ'00, pp. 148-162, 2000 (http://citeseerx.ist.psu.edu/viewdoc/summary?doi=10.1.1.43.2612).

A. Ojewole, Q. Zhu, and W.-C. Hou; Window join approximation over data streams with importance semantics; in CIKM'06, pp. 112-121, 2006 (http://portal.acm.org/citation.cfm?id=1183635).

L. Peng and K. S. Candan; Data-quality guided load shedding for expensive in-network data processing; In ICDE'07, pp. 1325-1328, 2007 (http://aria.asu.edu/candan/papers/icde2007-cready.pdf).

F. Reiss and J. M. Hellerstein; Data triage: An adaptive architecture for load shedding in TelegraphCQ; In ICDE'05, pp. 155-156, 2005 (http://citeseerx.ist.psu.edu/viewdoc/summary?doi=10.1.1.2.8132).

W. Shaw; Refinement of the Normal Quantile, Simple improvements to the Beasley-Springer-Moro method of simulating the Normal Distribution, and a comparison with Acklam's method and Wichura's AS241; Kings College working paper, 2007 (http://www.mth.kcl.ac.uk/~shaww/web_page/papers/NormalQuantile1.pdf).

U. Srivastava and J. Widom; Memory-limited execution of windowed stream joins; In VLDB'04, pp. 324-335, 2004 (http://infolab.stanford.edu/~usriv/papers/memory-limited.pdf).

V. C. Storey and R. Y. Wang; Modeling Quality Requirements in Conceptual Database Design; Proceedings of the 1998 Conference on Information Quality, Oct. 1998. pp. 64-87 (http://mitiq.mit.edu/Documents/Publications/TDQMpub/QEROct98.pdf).

D. M. Strong, Y. W. Lee, and R. Y. Wang; Data quality in context; ACM Communications, 40(5):103-110, 1997 (http://citeseerx.ist.psu.edu/viewdoc/download?doi=10.1.1.18.8200&rep=rep1&type=pdf).

N. Tatbul and S. Zdonik; Window-aware load shedding for aggregation queries over data streams; In VLDB'06, pp. 799-810, 2006 (http://www.inf.ethz.ch/personal/tatbul/publications/vldb06.pdf).

T. Urhan and M. J. Franklin; Xjoin: A reactively-scheduled pipelined join operator; IEEE Data Engineering Bulletin, 23:27-33, 2000 (http://citeseerx.ist.psu.edu/viewdoc/download?doi=10.1.1.35.7968&rep=rep1&type=pdf).

R. Y. Wang and D. M. Strong; Beyond accuracy: What data quality means to data consumers; Journal of Management Information Systems, 12(4):5-33,1996 (http://w3.cyu.edu.tw/ccwei/PAPER/ERP/data%20quality(JMIS).pdf).

Anja Klein, Hong-Hai Do, and Wolfgang Lehner; Representing data quality for streaming and static data; In Proceedings of the International Workshop on Ambient Intelligence, Media, and Sensing, Seiten Mar. 10, 2007 (http://portal.acm.org/citation.cfm?id=1547706).

Richard Y. Wang, Veda C. Storey, Christopher P. Firth; A Framework for Analysis of Data Quality Research; IEEE Transactions on Knowledge and Data Engineering, Aug. 1995 (http://web.mit.edu/tdqm/www/tdqmpub/SURVEYIEEEKDEAug95.pdf).

European Search Report for EP Application No. 10007389.9-2201, mailed Sep. 20, 2010, 9 pages; EPO, Munich, Germany.

Klein, Anja; Datenqualität in Sensordatenströmen; Doctoral Thesis TU Dresden Jun. 19, 2009; pp. 1-215, XP009138594; TU Dresden, Germany; (http://www.qucosa.de/fileadmin/data/qucosa/documents/2758/Diss_AnjaKlein_Datenqualit%C3%A4tInSensordatenstr%C3%B6men.pdf).

Anja Klein et al.; Representing Data Quality for Streaming and Static Data; Data Engineering Workshop, 2007 IEEE 23rd International Conference on; Apr. 15, 2007; pp. 3-10; ISBN: 978-1-4244-0831-3; IEEE, New Jersey, USA; (http://ieeexplore.ieee.org/xpl/freeabs_all.jsp?arnumber=4400967).

Brain Babcock, Mayur Datar, Rajeev Motwani; Load shedding Techniques for Data Stream Systems (short paper); in Proceedings of the 2003 Workshop on Management and Processing of Data Streams; Department of Computer Science, Stanford University, Stanford, CA 94305; (http://www-cs.stanford.edu/~datar/papers/mpds03.pdf).

\* cited by examiner

DELETING DATA STREAM OVERLOAD

FIELD OF THE INVENTION

The invention relates generally to data stream processing, and, more specifically, to deleting overload in data streams.

BACKGROUND OF THE INVENTION

As most data stream sources exhibit bursty data rates, data stream management systems must recurrently cope with overloads that exceed the average workload to a considerable degree. To guarantee low-latency processing results, load has to be shed from the stream, when data rates over-stress system resources. There exist numerous load shedding strategies to delete excess data. However, there may be consequent data loss that may lead to incomplete and/or inaccurate results during the ongoing stream processing.

Typical data stream sources provide potentially high arrival rates (such as, transactions in financial markets and production monitoring events), but sufficient resources may not be available for the required workload of numerous queries. For example, the critical resources during stream aggregations are computational power and stream bandwidth, while joins suffer from limited memory capacity. Furthermore, data streams tend to have dramatic peak overloads in data volume for temporary timeframes (for example, evening web traffic, high event rates during critical states in production processes, and so on). In some instances, it is impractical or impossible to provide resources to fully handle such a peak load. However, accurate data stream processing is most critical in such situations of high and bursty data load.

SUMMARY OF THE INVENTION

A system and method to delete overload in a data stream to maximize the data quality of processing results are described.

In one embodiment, a method to analyze tuples in a data stream and delete tuples from the data stream based on quality information obtained from the tuples is presented.

In one embodiment, tuples in a data stream may be deleted based on the value of one quality dimension as a priority over other quality dimensions.

In one embodiment, potential load shedding actions may be tested to evaluate which out of a set of possible load shedding actions is to be performed.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

Figure 1:
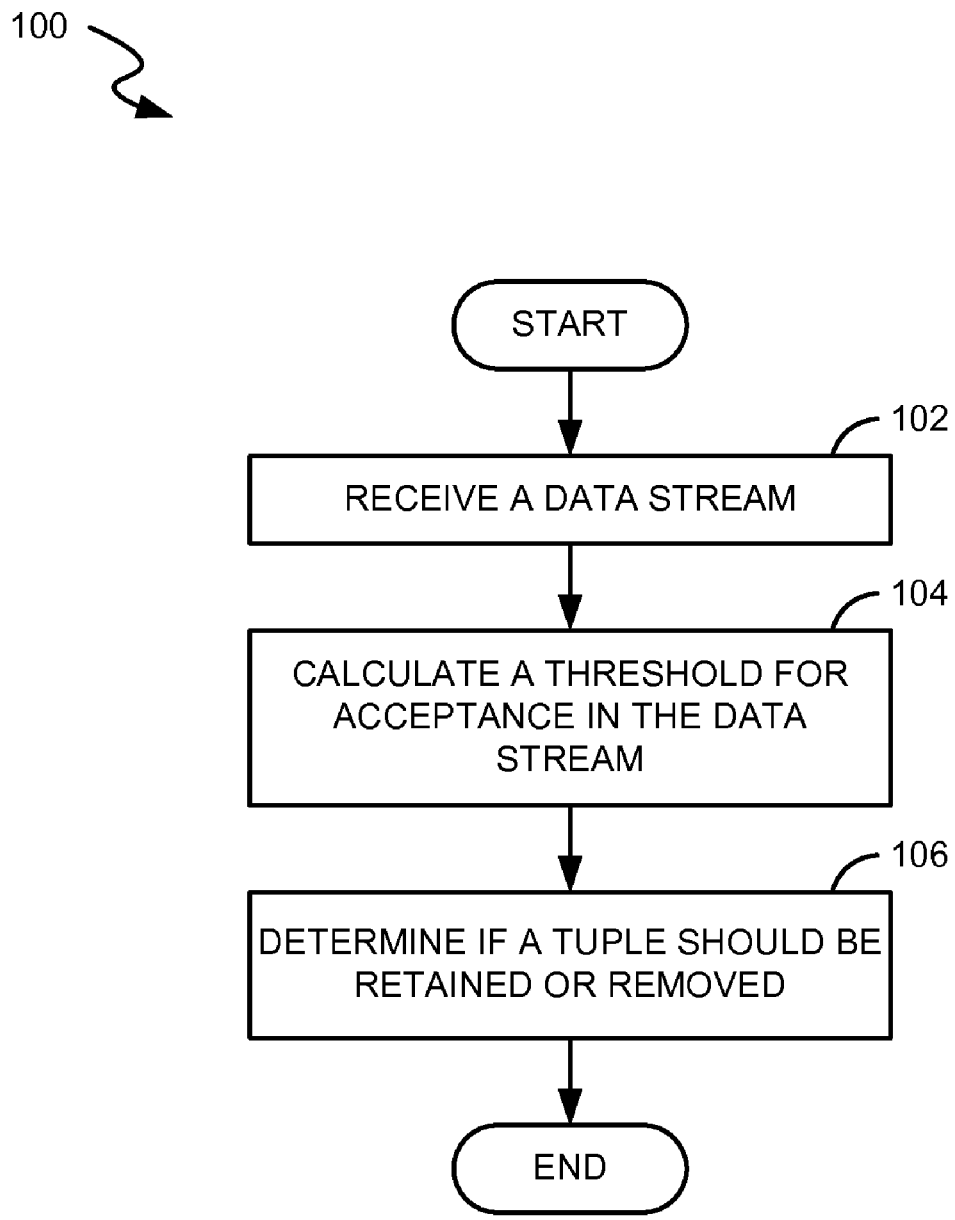
FIG. 1 is a flow diagram of an embodiment for performing load shedding based on data quality information.

Embodiments of systems and methods for deleting overload in a data stream are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "this embodiment" means that a particular feature, structure, or characteristic described in connection with the embodiment is included in at least one embodiment of the present invention. Thus, the appearances of the phrases "in one embodiment" or "in this embodiment" in various places throughout this specification are not necessarily all referring to the same embodiment. Furthermore, the particular features, structures, or characteristics may be combined in any suitable manner in one or more embodiments.

Embodiments may be used in systems for collecting and processing data in the form of data streams. Such systems may periodically experience overloads which may result in inaccurate processing of results because of the inability of a system to process overloads. A data stream may be a real-time, continuous, ordered (implicitly by arrival time or explicitly by timestamp) sequence of data items, collected with a certain stream rate over a given period of time. In one embodiment, the quality of data in a data stream may be analyzed to determine which parts of the data in the data stream to retain and which parts to delete. By deleting parts of the data in the data stream, overload on system resources is reduced. Also, by retaining data of higher quality, the result of the processing of the data stream may be improved, that is, the resulting processed data will be of better quality. Quality of data being processed by an application or system of an embodiment can be measured to determine, among other things, the utility of the data for specific applications, data use scenarios and so on. Various data quality dimensions may be applicable to various circumstances depending on applications and/or data use scenarios. Examples of data quality dimensions include timeliness, completeness, confidence, accessibility, readability, and so on.

Data quality may represent metadata information that describes the utility of any data item or any set of data items for a specific use scenario. A data quality of a data item or a set of data items may be described by a set of data quality dimensions each describing a specific data quality aspect, such as accuracy, confidence, completeness, timeliness, added-value, relevancy, accessibility, readability, and so on. To measure a data quality of a data item or a set of data items, the respective data quality dimensions have to be measured. For example, the completeness of a set of data items constitutes the ratio of available recorded data items in a database or data stream in comparison with real world data information. In another example, accuracy may describe the difference between a recorded data item in a database or data stream and the real world information represented by this data item, such that the accuracy may describe typing errors or sensor measurement errors.

A system processing streaming data may be configured with specific instructions to be applied to the processing of data in the event of an overload. An operator is typically an operation used in the processing of data. In other words, data processing is the process of applying a set of operators to data in a certain sequence. Some exemplary operators include selection, projection, join, interpolation, aggregation, and so on. Some operators may have attributes and some may not.

A data stream may include a continuous stream of m tuples $\tau$, that may have n attribute values $A_i$ for all $1 \leq i \leq n$ and a timestamp t. A tuple is a data item in a data stream. A tuple may include raw data and metadata about the raw data. The metadata in the tuple may include various measurements such as, but not limited to, a timestamp, measurements for quality dimensions of the tuple, and so on.

To determine if an overload exists in the system, system resources may be compared to the workload of incoming data streams and queries. To overcome an overload some portions of the data stream may need to be deleted, that is some tuples may be deleted and some tuples may be preserved. Deleting tuples from a data stream is also referred to as "load shedding" or "load shedding action". To determine which tuples are to be kept, and which tuples are to be deleted from a data stream (that is, load shedding is to be performed), tuples in the data stream may be rated according to some criteria.

In one embodiment, tuples may be rated according to data quality information included in metadata in the tuples. In one embodiment, load shedding may be performed based on data quality information. In the embodiment, tuples of lower data quality are discarded with a higher probability than tuples of high quality. Thus, more high quality tuples may remain in the data stream and the data quality of processing results (that is, processed data after the processing of the data stream completes) is improved and the data loss due to discarding overload tuples may be compensated. For example, aggregations are more precise and join result sets are more complete. In one embodiment, by rating tuples according to their quality and discarding tuples with less quality than a specified value, the quality of the data resulting from the processing of the data stream may be improved.

FIG. 1 is a flow diagram of an embodiment for performing load shedding based on data quality information. Referring to FIG. 1, at process block 102, a data stream is received. In one embodiment, the data stream is received from one or more sensors. At process block 104, a threshold for acceptance is calculated for the data stream. At process block 106, it is determined if a tuple should be deleted or retained in the data stream based on the threshold for acceptance.

In one embodiment, tuples may be rated according to a total data quality value. A total data quality value may be, for example, an aggregated value of monitored data quality dimensions. In another embodiment, there may be a need to improve a specific data quality dimension. In such an embodiment, a data quality dimension to be improved may take precedence before other data quality dimensions and tuples in the data stream may be rated according to the value of the quality dimension that needs to be improved (i.e. the one that takes precedence). In another embodiment, there may be a set of criteria for improving the data stream and a check may be performed to determine if the goals for the improvement of the data quality in the data stream can be achieved.

Figure 2:
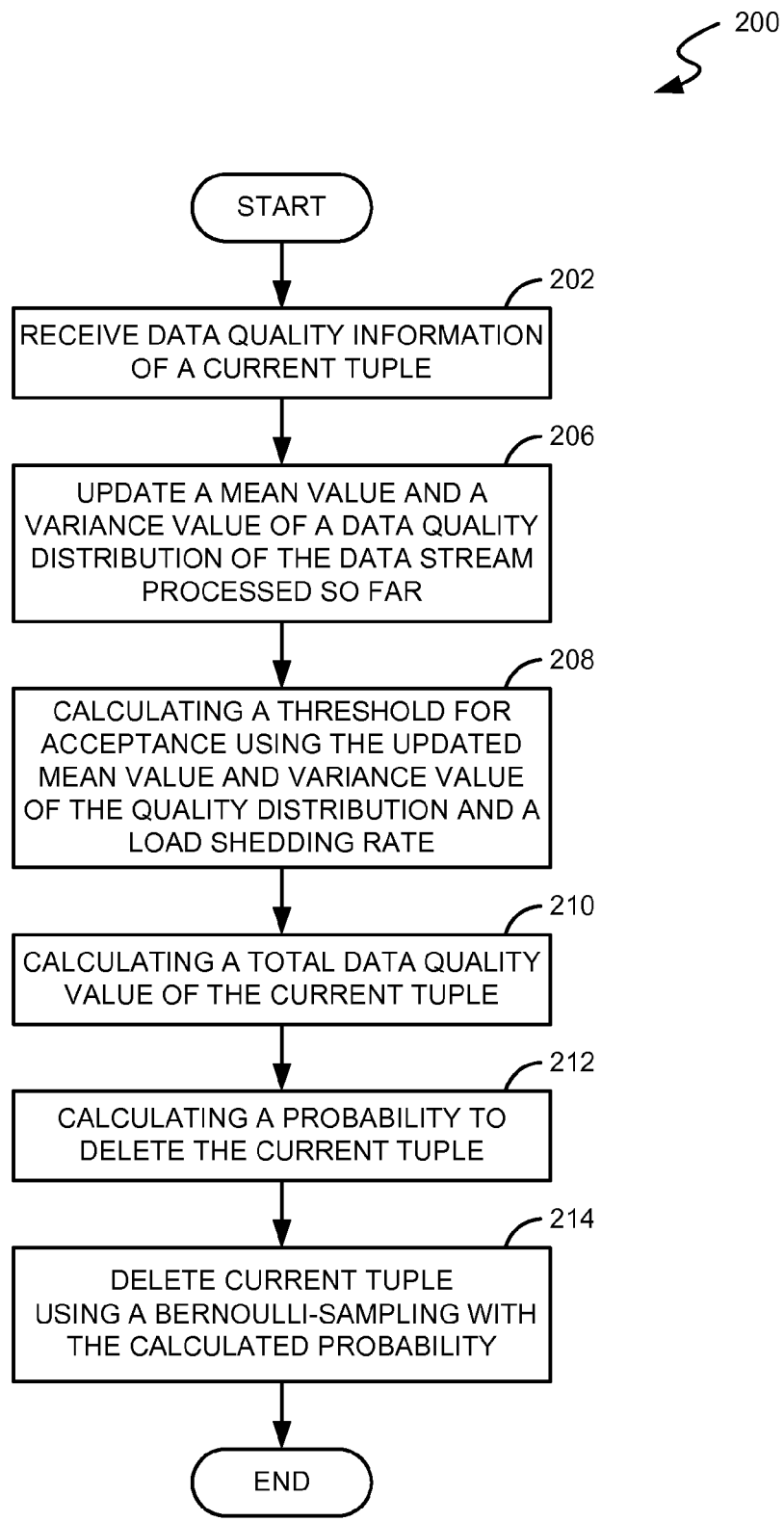
FIG. 2 is a flow diagram of another embodiment for deleting data stream overload based on data quality information.

FIG. 2 is a flow diagram of an embodiment for deleting data stream overload. Referring to FIG. 2, at process block 202, the data quality information of a tuple in a data stream is received. In one embodiment, the data stream may be split in partitions (i.e. segments) to facilitate data quality assessment and to enable the processing of smaller amounts of data at a time.

In one embodiment, the data stream may be split in consecutive, non-overlapping data quality windows and data quality information may be aggregated for the data quality window, i.e. a set of data quality information describing the quality of a set (window) of data items of a data stream may be averaged to compute the window-wise data quality. In another embodiment, the window-wise data quality used for a quality-driven load shedding may be computed as the maximum or minimum of the data quality information of the data items of this respective window. Thus, the data quality volume transferred in the data stream is reduced and the evaluation performance of data quality information for a quality-driven load shedding is improved. A data stream may be split in data quality windows according to various criteria, for example, a count of data stream tuples or a time interval. In some embodiments, the size of a data quality window may be constant and in some embodiments the size of a data quality window may change over time.

A major challenge during the load shedding based on data quality information is posed by the fact, that a straight-forward ordering of data items in a data stream according to their data quality information blocks the continuous data stream processing and transfer. To order the data items all data items with their data quality information are required, which is not the case in data stream applications. Therefore, other methods have to be found to evaluate the data quality of a data item and derive the appropriate load shedding activity of retaining or deleting the data item. One embodiment may use the data quality distribution of all data items in the data stream that have been processed in the past.

The use of the data quality distribution allows the determination of an acceptance threshold for the data quality of the current data item. The acceptance threshold may be defined as the inverse cumulative distribution function at the point of the required load shedding rate, i.e. the amount of data items that have to be deleted from the data stream given in the required load shedding rate determines the acceptance threshold of the data quality. In one embodiment, the data quality distribution may be described by a histogram of all incoming data quality values. In another embodiment, the data quality distribution may be assumed to be a normal distribution and may be described by the mean value and variance value of the incoming data quality values.

At process block 206, the mean value and the variance value of the data quality distribution of tuples processed so far are updated. The data quality distribution may represent the frequency of occurrence of data quality values of tuples processed in the data stream. With these updated values and a load shedding rate, at block 208, a threshold for acceptance is computed. The threshold for acceptance is updated for each current tuple, as the mean value and the variance value and the load shedding rate change with each tuple processed in the stream. The load shedding rate may be calculated as the ratio of tuples remaining in the stream and the total number of tuples. To determine if an overload exists, system resources are compared to the workload of all incoming data streams and queries. The threshold for acceptance may be used to appraise tuples in the data stream according to their data quality. The threshold for acceptance may separate tuples with high quality that are to be kept in the stream and low quality tuples that are to be deleted. At process block 210, a value representing the total data quality of the tuple is calculated At process block 212, a probability to delete the tuple is calculated based on the distance between the threshold for acceptance and the total data quality of the tuple. At process block 214, a Bernoulli sampling is performed with the calculated probability to execute the required load shedding and to discard the tuple if it is of low quality. In one embodiment, the Bernoulli probability $p_{Bernoulli}=d>(\theta,b)$, where $\theta$ is the total data quality of the tuple and b is the computed threshold for acceptance, may be computed from the sigmoid quality distance:

$$d>(\theta, b)=-0.5 \cdot \tan h(b-\theta)+0.5.$$

Such a choice of distance may provide a sampling probability $p \to 1$ when $\theta \ll b$ and a small sampling probability $p \to 0$ if $b \ll \theta$. The case where $b=\theta$ maybe modeled with $p_{Bernoulli}=0.5$.

Figure 3:
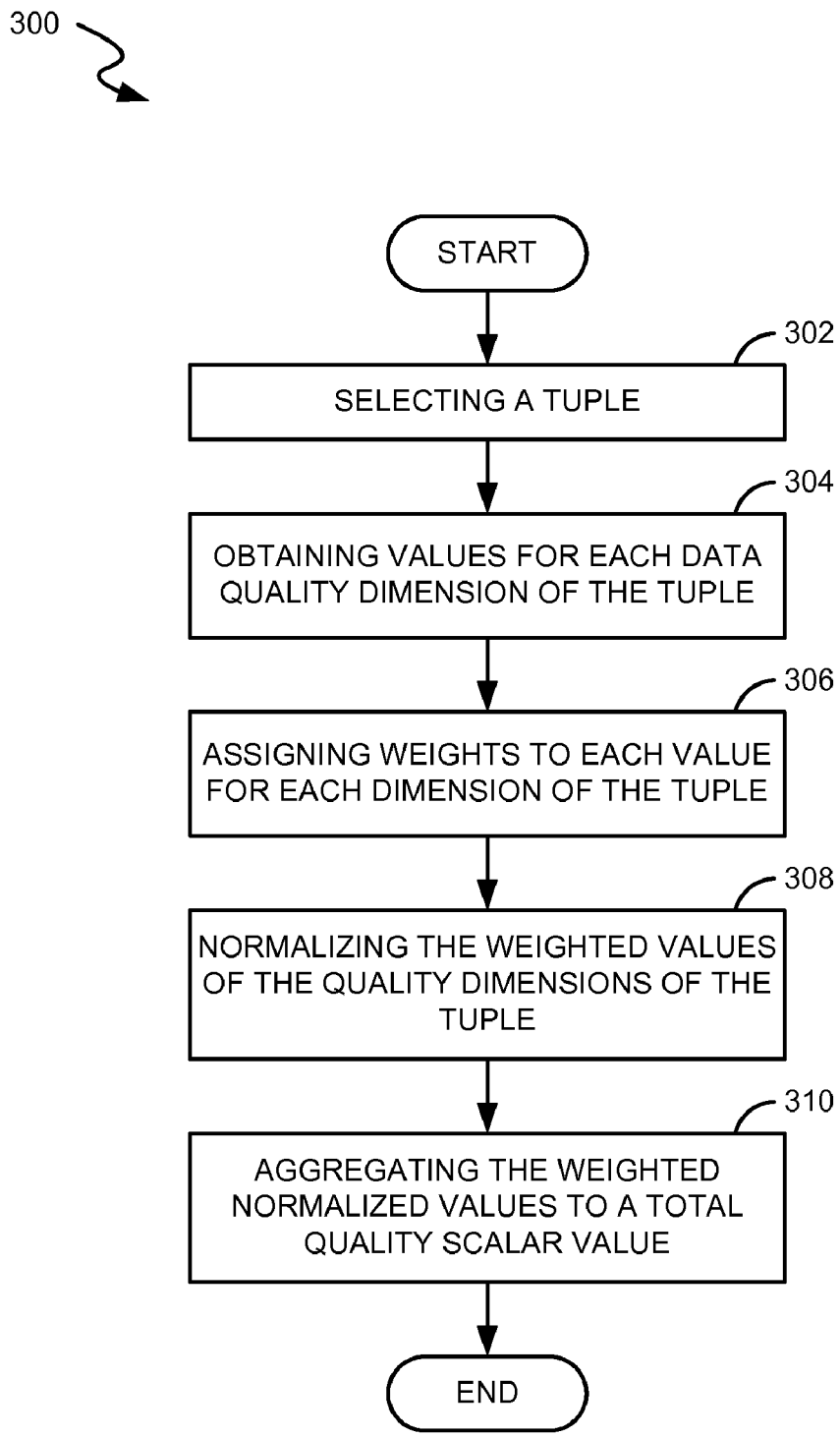
FIG. 3 is a flow diagram of an embodiment for calculating a total data quality value of a tuple.

FIG. 3 is a flow diagram of an embodiment for calculating a total data quality value of a tuple. The total data quality of the tuple may be calculated as an aggregation of the values of the quality dimensions of the tuple. In one embodiment, the values of the quality dimensions of the tuple are aggregated to a scalar value. In one embodiment, the total data quality of the tuple may be defined as the weighted average of the data quality information in each dimension $q_i$ with mean value $\mu(q_i)$ and standard deviation $\sigma(q_i)$ such that $$\theta = \frac{1}{|Q|} \sum_{i=1}^{|Q|} weight_i \cdot \frac{q_i - \mu(q_i)}{\sigma(q_i)}.$$

Referring to FIG. 3, at process block 302, a tuple is selected. At process block 304, the values for quality dimensions are obtained. At process block 306, each value is assigned a weight to facilitate the focus on data quality dimensions of interest. At process block 308, the weighted values are normalized. At process block 310, the weighted normalized values are aggregated to a scalar value. In one embodiment, this value is the total quality scalar value of the tuple used in process block 210 of FIG. 2. In one embodiment, a tuple in a data stream is assumed to have $|Q|$ data quality dimensions where $q \in Q$ may represent any of these data quality dimensions. In one embodiment, an analysis is performed on scalar values, that is, the value of q is a numerical value. In the embodiment, the total data quality of the tuple is denoted by $\theta$, where $\theta$ is an aggregated value of the quality dimensions under analysis, such that $\theta=\theta(q_1, q_2, \ldots, q_{|Q|})$. Thus, to appraise tuples in a data stream it is determined which tuples in the data stream are "higher" and which are "lower", meaning which tuples are of higher total quality. For example, a first tuple $x_1$ exceeds a tuple $x_2$ if the respective total data quality is smaller such that $x_1 > x_2 \equiv \theta_1 < \theta_2$.

In one embodiment, deleting data overload in a data stream may focus on improving the data quality dimension completeness of the resulting data after the processing of the data stream. This embodiment may be used to improve the completeness of the result set of a data stream join, where a memory capacity of the storage to store the incoming data stream tuples, that be will joined, is restricted. Thus, the data quality dimension completeness is prioritized and tuples and a data stream are analyzed to determine if the values of the data quality dimension of each tuple is higher or lower than a desirable value. To improve the data quality dimension completeness, tuples may be evaluated according to the value of their completeness. A threshold for acceptance with a focus on completeness may be computed. In one embodiment, it is the goal of a system processing the data stream to improve completeness. The system may have a storage (with a restricted memory capacity) to store tuples with a completeness higher than the computed threshold for acceptance. If a tuple has a value in the data quality dimension completeness higher than the threshold for acceptance, it is stored to the storage and the tuple that has the lowest completeness in the storage is deleted. If a tuple has a value in the data quality dimension completeness lower than the threshold for acceptance, it is deleted. Thus, over time, the storage may store the tuples with the highest completeness.

Figure 4:
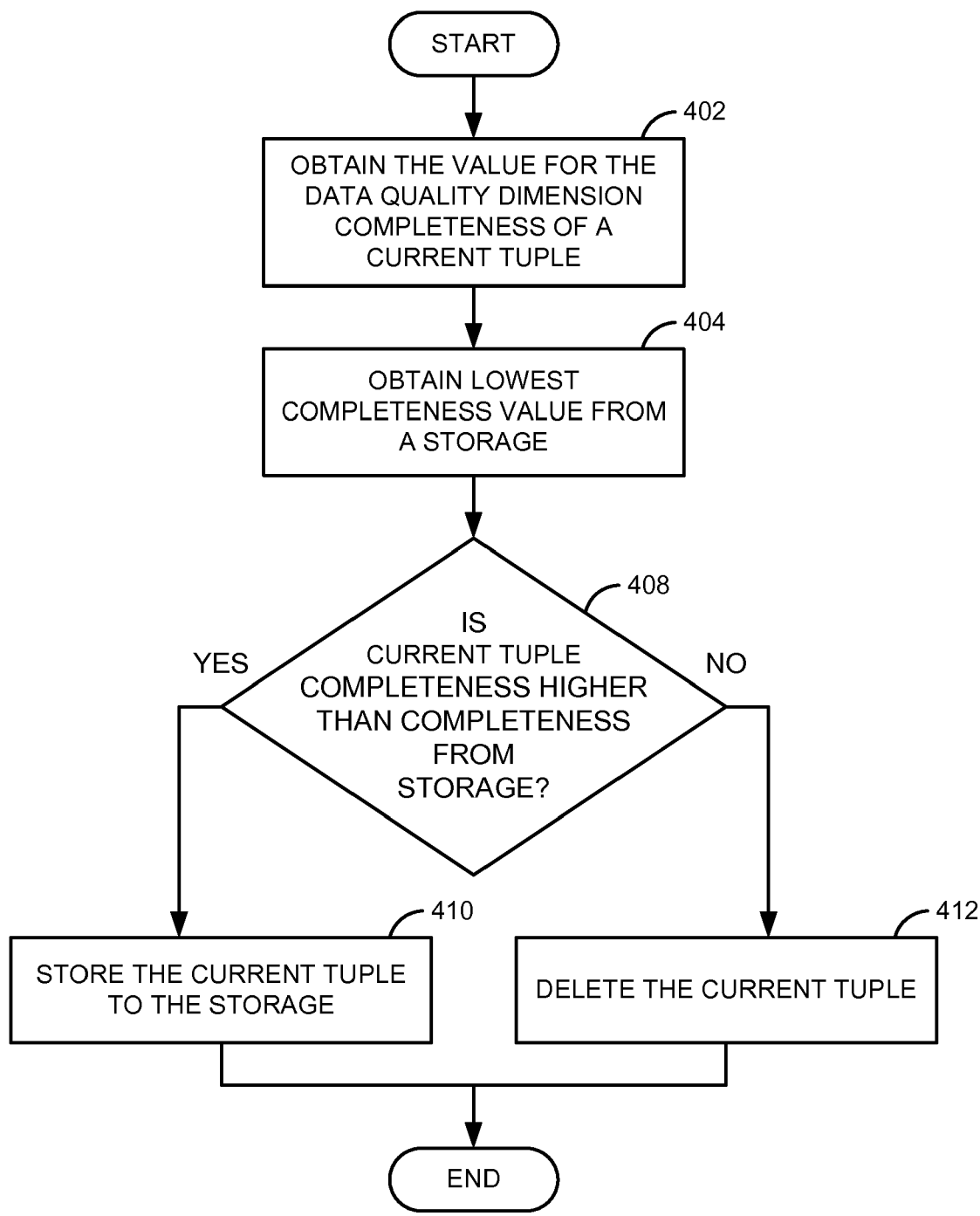
FIG. 4 is a flow diagram of an embodiment for improving data quality dimension completeness in a data stream using a load shedding approach for tuples.

FIG. 4 is a flow diagram of an embodiment for improving data quality dimension completeness in a data stream using a load shedding approach for tuples. Referring to FIG. 4, at process block 402, the value of the data quality dimension completeness is obtained from the current tuple in the data stream. At process block 404, the lowest completeness value of tuples stored in a storage is obtained. At process block 408, the completeness value obtained from the current tuple is compared to the completeness value obtained from the storage. If the completeness value of the tuple is lower than the completeness value obtained from storage, the tuple is deleted at process block 412. If the completeness value of the tuple is higher than the completeness value obtained from the storage, the tuple that had that lowest completeness value in the storage is deleted from the storage. If the tuple has a completeness value higher than the lowest completeness value obtained from the storage, the tuple is saved to the storage and the tuple with the lowest completeness value in the storage is deleted from the storage at process block 410.

In another embodiment, the data quality of the resulting data after the processing of the data stream may be improved by evaluating the outcome of a potential deletion of a tuple. It is necessary to evaluate the outcome because deleting or keeping a tuple may affect the resulting data quality of the resulting data after the data stream is processed. For example, deleting a tuple may lead to a better data quality of the resulting data after the data stream is processed, if the tuple has values in the quality dimensions lower than the average of the data stream or deleting it might have a positive impact on the error introduced by the information loss due to load shedding, i.e. deleting it might decrease the variance of the data items in the data stream. In another example, if a tuple has high data quality values or keeping it might have a positive impact on the error introduced by the information loss due to load shedding, i.e. keeping it might decrease the variance of the data items in the data stream, it may be beneficial to preserve the tuple in the data stream and thus improve the data quality of the resulting data after the data stream is processed. Therefore, the two potential outcomes are evaluated so that a decision can be made about which of the two options is better for the resulting data quality of the resulting data after the data stream is processed.

Figure 5A:
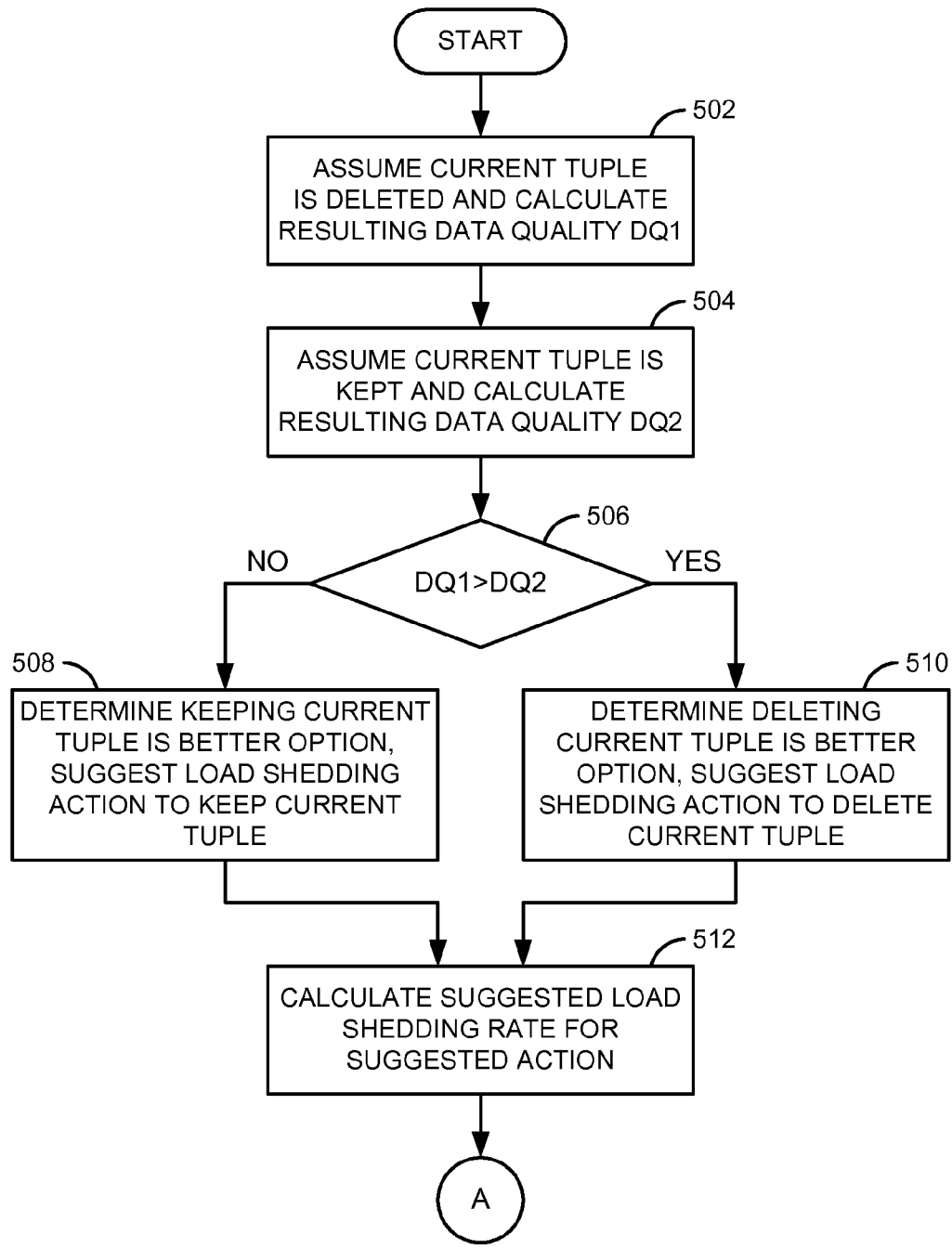
FIG. 5A is a flow diagram of a first part of a process of an embodiment for evaluating load shedding actions and performing load shedding action that is determined to deliver a better outcome.

FIG. 5A is a flow diagram of a first part of a process of an embodiment for evaluating load shedding actions and performing load shedding action that is determined to deliver a better outcome. Referring to FIG. 5A, at process block 502, a data quality DQ1 is calculated. DQ1 represents the resulting data quality in the data stream if the tuple being processed is deleted. At process block 504, a data quality DQ2 is calculated. DQ2 represents the resulting data quality in the data stream if the tuple being processed is kept. At process block 506, DQ1 is compared to DQ2. If DQ1 is lower than DQ2, at process block 508, it is determined that keeping the tuple in the data stream may lead to better quality in the data stream and a load shedding action to keep the tuple is suggested. If DQ1 is higher than DQ2, at process block 510, it is determined that deleting the tuple is the better option for the quality of the data stream and a load shedding action for deleting the tuple is suggested. At process block 512, a suggested load shedding rate is calculated for the suggested load shedding action.

Figure 5B:
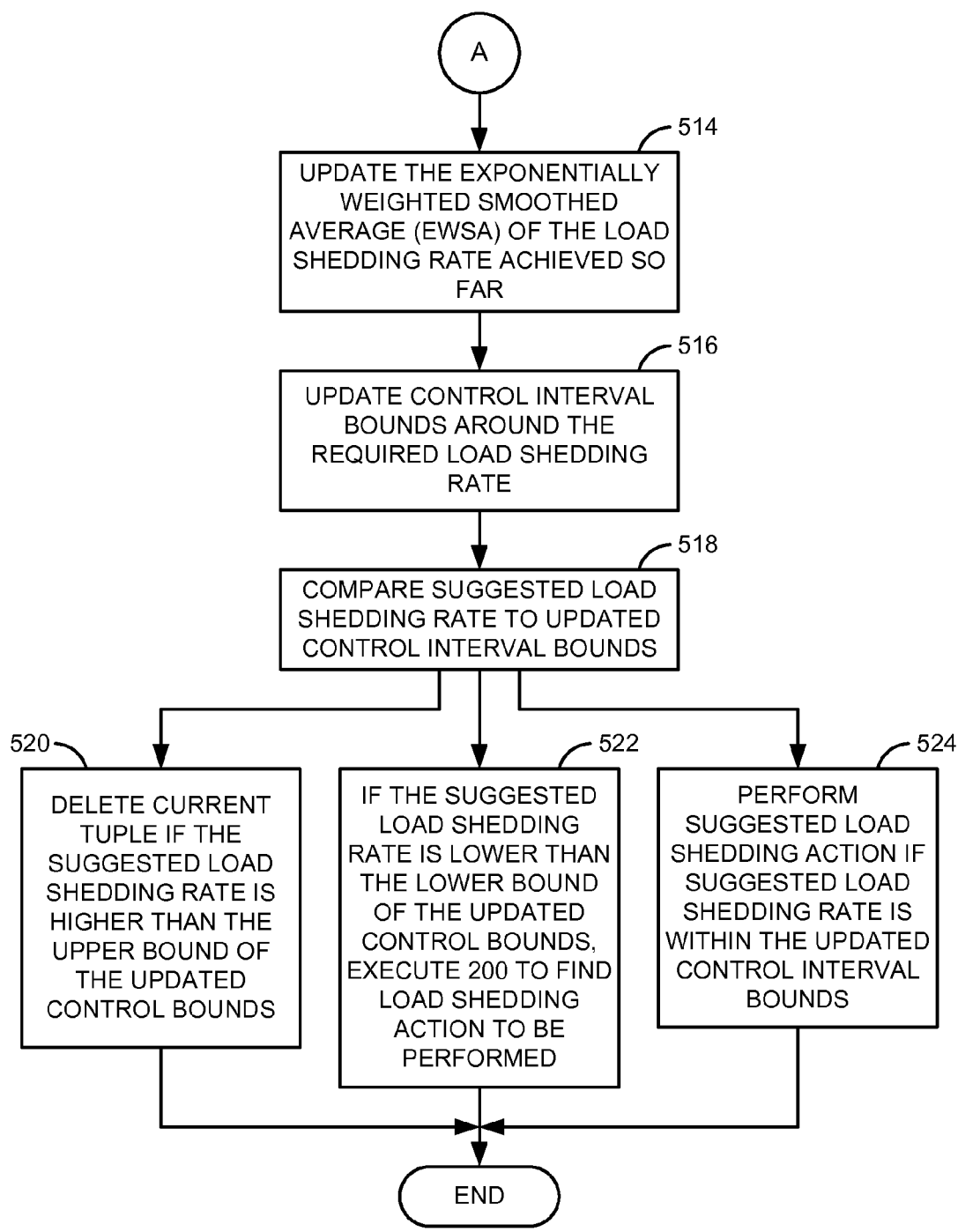
FIG. 5B is a flow diagram of a second part of a process of an embodiment for evaluating load shedding actions and performing load shedding action that is determined to deliver a better outcome.

FIG. 5B is a flow diagram of a second part of a process of an embodiment for evaluating load shedding actions and performing load shedding action that is determined to deliver a better outcome. At process block 514, a method of the statistical process control is applied to stabilize the load shedding execution and guarantee the required load shedding rate. In one embodiment, the process control method may be the exponentially weighted smoothed average (EWSA), that ensures stable system behavior, such that $EWSA_{j+1} = \beta \cdot r_{j+1} + (1-\beta) \cdot EWSA_j$, where j describes the timestamp of the data stream processing for all $0 \leq j \leq \infty$, $r_{j+1}$ is the currently suggested load shedding rate and $\beta$ is the smoothing parameter describing the degree of performed smoothing. Exponential smoothing is a technique commonly used for repeated measurements to produce smoothed data for forecasts. The exponentially smoothed average of the load shedding rate achieved so far is updated with the suggested load shedding rate to achieve a smooth trend. With the help of the EWSA the suggested load shedding rate converges to the required load shedding rate. At process block 516, using the EWSA, an interval [lowerBound, upperBound] is defined around the required load shedding rate, such that $upperBound = r_{LS}$ and $lowerBound = r_{LS} - \rho \cdot \sigma(EWSA)$, where $r_{LS}$ is the required load shedding rate, $\rho$ describes the quantile of the confidence probability p (e.g. $\rho = 2.58$ for p=99%) and $\sigma(EWSA)$ describes the variance of the exponentially smoothed average.

Thus, the lower and upper bounds of this interval are the control interval bounds, which are updated and used to decide which load shedding action should be performed. The required load shedding rate is the load shedding rate required by the system to process the data stream without overload. The suggested load shedding rate is compared to this control interval around the required load shedding rate, so that small temporary derivations from the required load shedding rate are enabled to allow for the improvement of the resulting data quality of the data stream. By using the smoothed trend of the EWSA, the required load shedding rate is guaranteed despite these temporary derivations for the overall data stream.

At process block 518, the suggested load shedding rate is compared to the updated control interval bounds. If the suggested load shedding rate is higher than the higher bound of the updated control interval bounds, it is determined that the tuple should be deleted at process block 520. It is determined that the tuple should be deleted, because, if the suggested load shedding rate is higher than the higher bound of the control interval bounds, then the required load shedding rate can not be achieved with the suggested load shedding action and the tuple has to be deleted to guarantee the required reduction of the system overload (that is, overload in the data stream). If the suggested load shedding rate is lower than the lower bound of the updated control interval bounds, it is determined that unused capacity exists in the system, and the tuple should not be deleted. Thus, at process block 522, it is decided to keep the tuple and the process described in FIG. 2 is executed to determine the best load shedding action to perform with respect to improving the data quality in the data stream. If the suggested load shedding rate is within the updated control interval bounds, it is determined that the required load shedding rate can be achieved and the suggested load shedding action is performed at process block 524.

Figure 6:
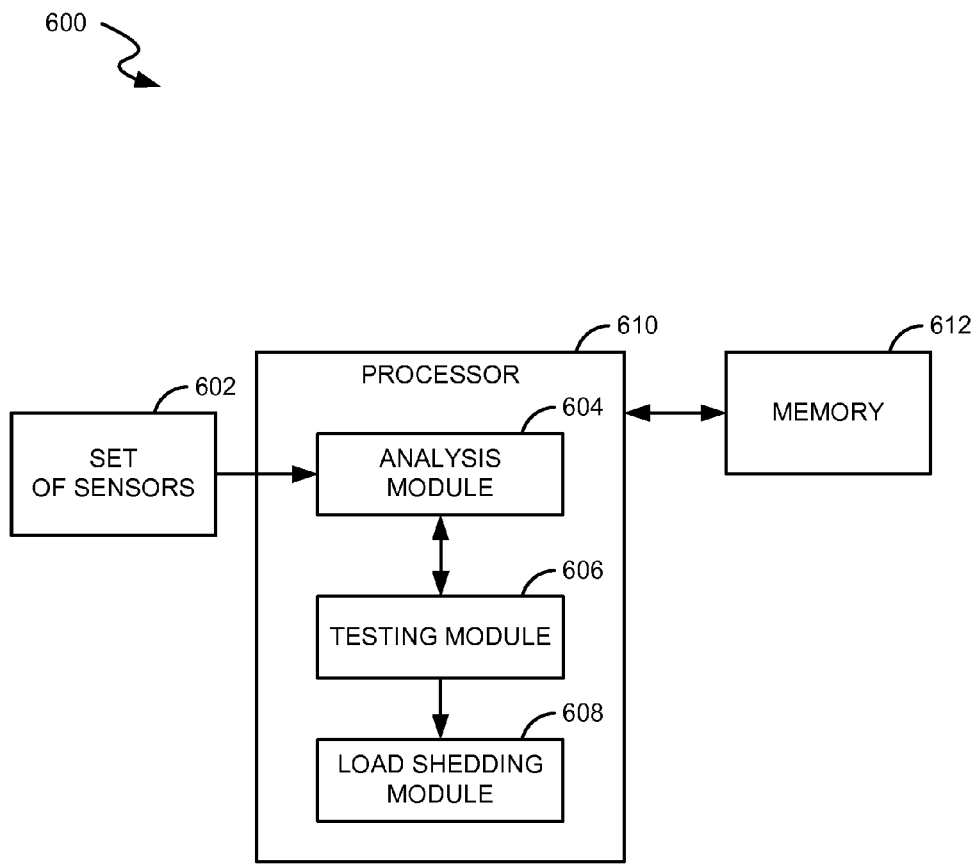
FIG. 6 is a block diagram of an embodiment for deleting data overload in a data stream.

FIG. 6 is a block diagram of an embodiment for deleting data overload in a data stream. The system 600 includes a set of sensors 602 to collect streaming data. An analysis module 604 may obtain the data collected by the set of sensors 602. The analysis module may be stored on a memory 612 and loaded in a processor 610 to perform operations during runtime of the system 600. In one embodiment, the analysis module may analyze the data quality information in the data stream as a whole, or the data quality information of a tuple in the data stream, or both. In one embodiment, the analysis module may analyze the quality information in the data stream and which tuples in the data stream may be deleted to improve the overall data quality of the data stream. The load shedding module 608 in the system 600 may be stored in the memory 612 and may be loaded in the processor 610 to perform load shedding during the runtime of the system 600. In one embodiment, the analysis module 604 may determine which tuples in the data stream should be deleted and send instructions using the processor to the load shedding module to delete the designated tuples.

The system 600 also includes a testing module 606. In one embodiment the testing module 606 is used to test alternative scenarios for load shedding. The testing module may test alternative scenarios for load shedding in the data stream and determine if a required load shedding rate is achievable. A required load shedding rate may depend on the available capacity and resources in the system 600. To determine if an overload exists, system resources are compared to the workload of all incoming data streams and queries.

In an alternative embodiment, the system 600 requires the resulting processed data to have an optimal value of the data quality dimension completeness. In this embodiment, the analysis module 604 may calculate the completeness of tuples and tuples with high completeness may be sent through the processor 610 to be stored on the memory. The testing module 606 may test each consecutive tuple to determine if the completeness of the tuple is higher or lower compared to the lowest completeness stored in the memory 612. In one embodiment, the testing module may send instructions to the load shedding module 608 to delete a tuple if the tuple is of unacceptable quality as compared to the tuples already stored to the memory 612.

In one embodiment, the process as described in FIG. 1 may be performed by components as described in FIG. 6.

In one embodiment, process as described in FIG. 2 may be performed by components as described in FIG. 6.

In one embodiment, the process as described in FIG. 3 may be performed by components as described in FIG. 6.

In one embodiment, the process as described in FIG. 4 may be performed by components as described in FIG. 6.

In one embodiment, the process as described in FIG. 5A may be performed by components as described in FIG. 6.

In one embodiment, the process as described in FIG. 5B may be performed by components as described in FIG. 6.

Some example embodiments of the invention may include the above-illustrated modules and methods being written as one or more software components. These components, and the functionality associated with each, may be used by client, server, or peer computer systems. These components may be written in any computer programming languages including object-oriented computer languages such as C++, and Java. The functionality described herein may be distributed among different components and may be linked to each other via application programming interfaces and compiled into one complete server and/or client application. Furthermore, these components may be linked together via distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or other configurations.

Software components described above are tangibly stored on a machine readable medium including a computer readable medium. The term "computer readable medium" should be taken to include a single medium or multiple media that stores one or more sets of instructions. The term "computer readable medium" should also be taken to include medium that is capable of tangibly storing or encoding instructions for execution by a computer system and that causes the computer system to perform any of the methods described herein.

Figure 7:
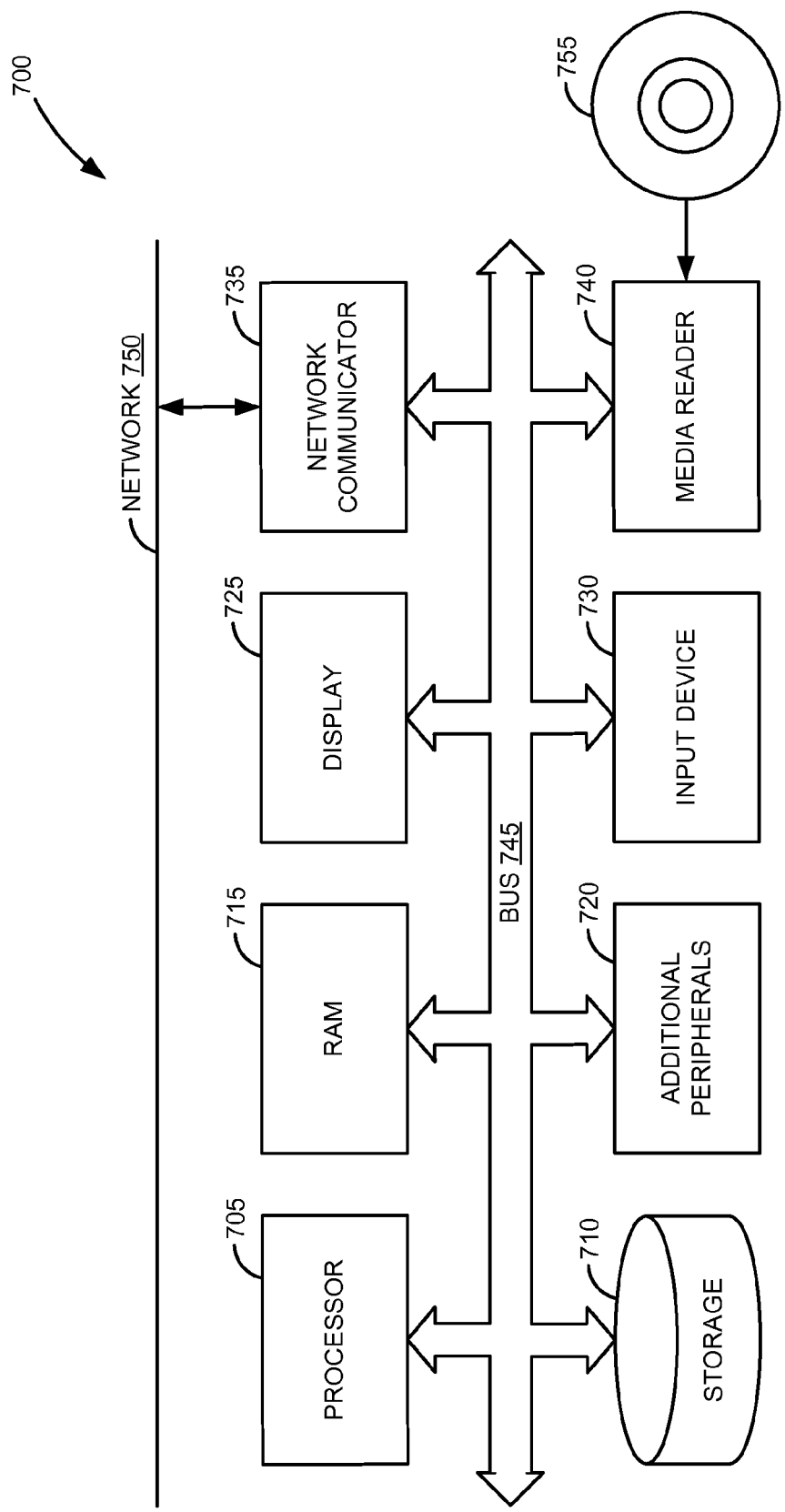
FIG. 7 is a block diagram of another embodiment for a system for deleting data overload in a data stream.

FIG. 7 is a block diagram of an exemplary computer system 700. The computer system 700 includes a processor 705 that executes programming code tangibly stored on a computer readable medium 755 to perform the above-illustrated methods of the invention. The computer system 700 includes a media reader 740 to read the programming code from the computer readable medium 755 and store the code in storage 710 or in random access memory (RAM) 715. The storage 710 provides a large space for keeping static data where the programming code could be stored for later execution. From the programming code, a series of instructions are generated and dynamically stored in the RAM 715. The processor 705 reads instructions from the RAM 715 and performs actions as instructed. According to one embodiment of the invention, the computer system 700 further includes a display 725 to provide visual information to users, an input device 730 to provide a user with means for entering data and interfere with computer system 700, one or more additional peripherals 720 to further expand the capabilities of the computer system 700, and a network communicator 735 to connect the computer system 700 to a network 750. The components of the computer system 700 are interconnected via a bus 745.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is

1. A machine-readable storage device having machine readable instructions tangibly stored thereon, which when executed by the machine, cause the machine to:
receive a data stream from one or more sensors;
receive data quality information of a current tuple in the data stream;
calculate a first data quality value, wherein the first data quality value represents the resulting data quality of processed data when the current tuple is deleted;
calculate a second data quality value, wherein the second data quality value represents the data quality of the processed data when the current tuple is retained;
compare the first data quality value and the second data quality value;
suggest a load shedding action based on outcome of comparing the first data quality value and the second data quality value, wherein the suggested load shedding action is to:
 delete the current tuple from the data stream when the first data quality value is higher than the second data quality value, and
 retain the current tuple in the data stream when the first data quality value is lower than the second data quality value;
calculate a suggested load shedding rate based on the suggested load shedding action;
using the suggested load shedding rate, update an exponentially weighted smoothed average (EWSA) of a current load shedding rate, wherein the EWSA of the current load shedding rate reflects the status of the data stream prior to the current tuple;
using the updated EWSA, update control interval bounds around a required load shedding rate;
compare the suggested load shedding rate to the updated control interval bounds; and
choose a load shedding action based on result of comparing the suggested load shedding rate to the updated control interval bounds.

2. The machine-readable storage device of claim 1, wherein the required load shedding rate is a load shedding rate required to utilize a resource capacity in a system.

3. The machine-readable storage device of claim 1, wherein the instructions to choose the load shedding action based on the result of comparing the suggested load shedding rate to the updated control interval bounds further comprise instructions, which when executed by the machine, cause the machine to:
perform the suggested load shedding action when the suggested load shedding rate is within the updated control interval bounds;
delete the currently processed tuple when the suggested load shedding rate is higher than the upper bound of the updated control interval bounds; and
perform additional analysis of the data quality information of the current tuple when the suggested load shedding rate is lower than the lower bound of the updated control interval bounds.

4. A computerized system, including:
a processor; and
a memory in communication with the processor, the memory storing instructions related to:
a set of sensors to collect streaming data for a set of operations generating data at a rate, wherein the streaming data includes a set of tuples;
an analysis module to:
 receive data quality information of a current tuple in the streaming data;
 calculate a first data quality value, wherein the first data quality value represents the resulting data quality of processed data when a current tuple is deleted;
 calculate a second data quality value, wherein the second data quality value represents the data quality of the processed data when the current tuple is retained;
 compare the first data quality value and the second data quality value;

suggest a load shedding action based on outcome of comparing the first data quality value and the second data quality value, wherein the suggested load shedding action is to:
  delete the current tuple from the streaming data when the first data quality value is higher than the second data quality value, and
  retain the current tuple in the streaming data when the first data quality value is lower than the second data quality value,
calculate a suggested load shedding rate based on the suggested load shedding action;
using the suggested load shedding rate, update an exponentially weighted smoothed average (EWSA) of a current load shedding rate, wherein the EWSA of the current load shedding rate reflects the status of the streaming data prior to the current tuple;
using the updated EWSA, update control interval bounds around a required load shedding rate;
compare the suggested load shedding rate to the updated control interval bounds; and
choose a load shedding action based on result of comparing the suggested load shedding rate to the updated control interval bounds.

5. The system of claim 4, wherein the required load shedding rate is a load shedding rate required to utilize a resource capacity in the system.

6. The system of claim 4, wherein the analysis module is further operable to:
  perform the suggested load shedding action when the suggested load shedding rate is within the updated control interval bounds;
  delete the currently processed tuple when the suggested load shedding rate is higher than the upper bound of the updated control interval bounds; and
  perform additional analysis of the data quality information of the current tuple when the suggested load shedding rate is lower than the lower bound of the updated control interval bounds.

7. A computerized method executing on a processor, the method comprising:
  receiving a data stream from one or more sensors;
  receiving data quality information of a current tuple in the data stream;
  the processor calculating a first data quality value, wherein the first data quality value represents the resulting data quality of processed data when the current tuple is deleted;
  the processor calculating a second data quality value, wherein the second data quality value represents the data quality of the processed data when the current tuple is retained;
  the processor comparing the first data quality value and the second data quality value;
  the processor suggesting a load shedding action based on outcome of comparing the first data quality value and the second data quality value, wherein the suggested load shedding action is to:
    delete the current tuple from the data stream when the first data quality value is higher than the second data quality value, and
    retain the current tuple in the data stream when the first data quality value is lower than the second data quality value
  the processor calculating a suggested load shedding rate based on the suggested load shedding action;
  using the suggested load shedding rate, updating an exponentially weighted smoothed average (EWSA) of a current load shedding rate, wherein the EWSA of the current load shedding rate reflects the status of the data stream prior to the current tuple;
  using the updated EWSA, updating control interval bounds around a required load shedding rate;
  the processor comparing the suggested load shedding rate to the updated control interval bounds; and
  choosing a load shedding action based on result of comparing the suggested load shedding rate to the updated control interval bounds.

8. The computerized method of claim 7, wherein choosing the load shedding action based on the result of comparing the suggested load shedding rate to the updated control interval bounds further comprises:
  the processor performing the suggested load shedding action when the suggested load shedding rate is within the updated control interval bounds;
  the processor deleting the currently processed tuple when the suggested load shedding rate is higher than the upper bound of the updated control interval bounds; and
  the processor performing additional analysis of the data quality information of the current tuple when the suggested load shedding rate is lower than the lower bound of the updated control interval bounds.

9. The method of claim 7, wherein the required load shedding rate is a load shedding rate required to utilize a resource capacity in a system.

* * * * *